United States Patent
Pichler et al.

(10) Patent No.: US 11,586,869 B2
(45) Date of Patent: Feb. 21, 2023

(54) RFID TRANSPONDER AND METHOD OF OPERATING AN RFID TRANSPONDER

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

(*) Notice: Subject to any disclaimer, the term of this patent is extended or adjusted under 35 U.S.C. 154(b) by 39 days.

(21) Appl. No.: 17/221,419

(22) Filed: Apr. 2, 2021

(65) Prior Publication Data
US 2021/0342661 A1 Nov. 4, 2021

(30) Foreign Application Priority Data
May 1, 2020 (EP) ..................................... 20172572

(51) Int. Cl.
*G06K 19/07* (2006.01)
*H02M 3/07* (2006.01)

(52) U.S. Cl.
CPC ..... *G06K 19/0713* (2013.01); *G06K 19/0723* (2013.01); *H02M 3/07* (2013.01)

(58) Field of Classification Search
CPC ........... G06K 19/0713; G06K 19/0723; G06K 19/0715; G06K 7/10198; H02M 3/07
See application file for complete search history.

(56) References Cited

U.S. PATENT DOCUMENTS

| | | | |
|---|---|---|---|
| 5,446,447 A * | 8/1995 | Carney | G08B 13/2471 340/505 |
| 6,424,570 B1 | 7/2002 | Le et al. | |
| 7,834,661 B2 * | 11/2010 | Ku | H03K 19/018571 327/333 |
| 7,965,067 B2 | 6/2011 | Gronthal et al. | |
| 7,973,592 B2 | 7/2011 | Pan | |
| 8,035,440 B2 | 10/2011 | Hernandez-Garduno et al. | |
| 2007/0103311 A1 * | 5/2007 | Kippelen | G06K 19/07749 235/492 |
| 2009/0219079 A1 * | 9/2009 | Bergler | G06K 19/0723 327/536 |

FOREIGN PATENT DOCUMENTS

| | | |
|---|---|---|
| EP | 1909384 A2 | 4/2008 |
| EP | 2424092 A1 | 2/2012 |
| WO | 2017/040059 A1 | 3/2017 |

\* cited by examiner

*Primary Examiner* — Seung H Lee

(57) ABSTRACT

In accordance with a first aspect of the present disclosure, a radio frequency identification (RFID) transponder is provided, comprising a charge pump and at least one functional component, wherein: the charge pump is configured to convert an input voltage into an output voltage and to supply the output voltage to the functional component; the functional component is configured to perform a function of the RFID transponder using the output voltage of the charge pump; wherein the charge pump comprises a diode or switch transistor and at least one capacitor coupled to said diode or switch transistor, and wherein the capacitor is configured to compensate for a change of an impedance of said diode or switch transistor. In accordance with a second aspect of the present disclosure, a corresponding method of operating an RFID transponder is conceived.

17 Claims, 7 Drawing Sheets

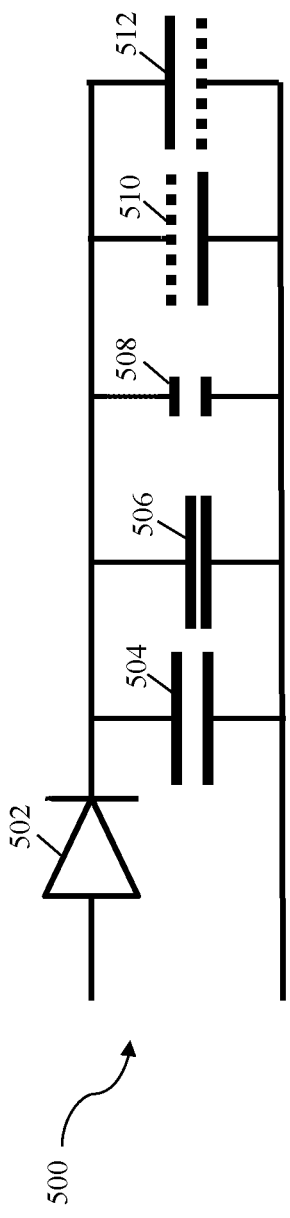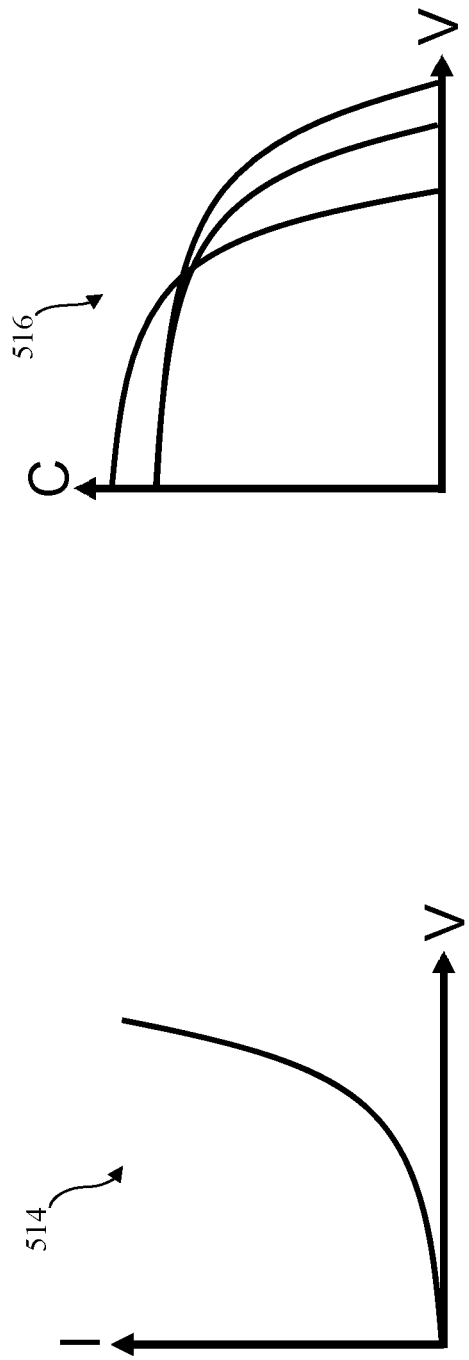
FIG. 5A
FIG. 5B
FIG. 5C

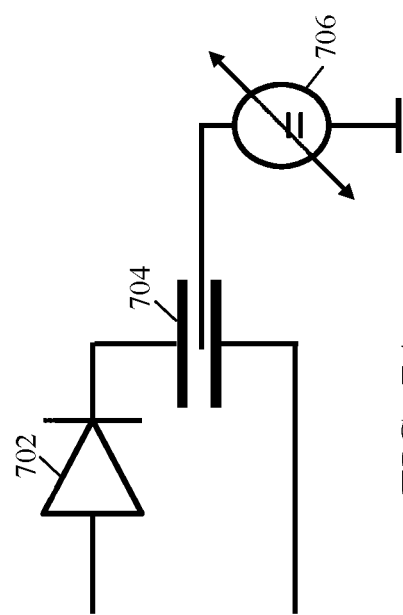
FIG. 7A
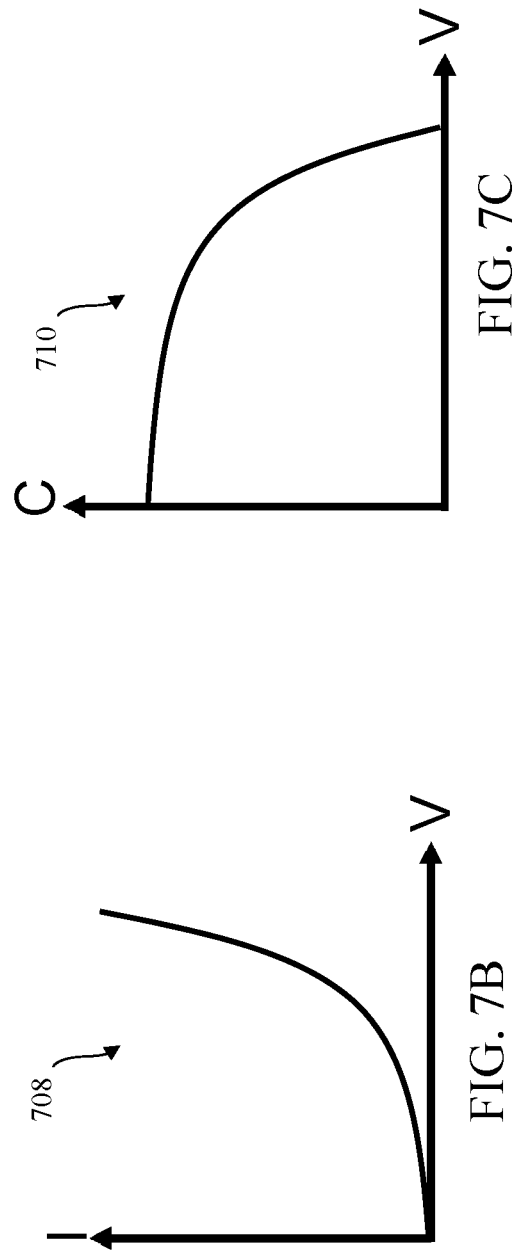
FIG. 7B
FIG. 7C

RFID TRANSPONDER AND METHOD OF OPERATING AN RFID TRANSPONDER

CROSS-REFERENCE TO RELATED APPLICATIONS

This application claims priority under 35 U.S.C. § 119 to European Patent Application No. 20172572.8, filed on May 1, 2020, the contents of which are incorporated by reference herein.

TECHNICAL FIELD

The present disclosure relates to a radio frequency identification (RFID) transponder. Furthermore, the present disclosure relates to a corresponding method of operating an RFID transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders. RFID transponders often contain charge pumps, which are configured to raise the input voltage of the transponders to an adequate operating voltage for the components of the transponders.

SUMMARY

In accordance with a first aspect of the present disclosure, a radio frequency identification (RFID) transponder is provided, comprising a charge pump and at least one functional component, wherein: the charge pump is configured to convert an input voltage into an output voltage and to supply the output voltage to the functional component; the functional component is configured to perform a function of the RFID transponder using the output voltage of the charge pump; wherein the charge pump comprises a diode or switch transistor and at least one capacitor coupled to said diode or switch transistor, and wherein the capacitor is configured to compensate for a change of an impedance of said diode or switch transistor.

In one or more embodiments, the charge pump comprises a plurality of capacitors coupled to the diode or switch transistor, wherein said capacitors have different types, values and/or geometries.

In one or more embodiments, the RFID transponder further comprises a charge pump controller which is configured to connect and disconnect the respective capacitors from the diode or switch transistor.

In one or more embodiments, the charge pump controller is further configured to connect and disconnect at least one of said capacitors from a clock input line of the charge pump.

In one or more embodiments, the RFID transponder further comprises at least one sensor configured to sense an environmental parameter, a fabrication parameter and/or a functional parameter of the RFID transponder.

In one or more embodiments, the RFID transponder further comprises a varactor configured to change the value of the capacitor.

In one or more embodiments, the varactor is configured to change the value of the capacitor in dependence on the sensed environmental parameter, fabrication parameter and/or functional parameter of the RFID transponder.

In one or more embodiments, the capacitor is configured to compensate for a change of the impedance of said diode or switch transistor by having a capacitance which increases, respectively decreases, at substantially the same rate as a resistance of the diode or switch transistor decreases, respectively increases, in response to a change of the input voltage.

In accordance with a second aspect of the present disclosure, a method of operating an RFID transponder is conceived, the method comprising: converting, by a charge pump of the RFID transponder, an input voltage to an output voltage, wherein the charge pump comprises a diode or switch transistor and at least one capacitor coupled to said diode or switch transistor, and wherein the capacitor compensates for a change of an impedance of said diode or switch transistor; supplying, by the charge pump, the output voltage to at least one functional component of the RFID transponder; performing, by the functional component, a function of the RFID transponder using the output voltage of the charge pump.

In one or more embodiments, the charge pump comprises a plurality of capacitors coupled to the diode or switch transistor, wherein said capacitors have different types, values and/or geometries.

In one or more embodiments, the method further comprises connecting and disconnecting, by a charge pump controller comprised in the RFID transponder, the respective capacitors from the diode or switch transistor.

In one or more embodiments, the method further comprises connecting and disconnecting, by the charge pump controller, at least one of said capacitors from a clock input line of the charge pump.

In one or more embodiments, the method further comprises sensing, by at least one sensor comprised in the RFID transponder, an environmental parameter, a fabrication parameter and/or a functional parameter of the RFID transponder.

In one or more embodiments, the method further comprises changing, by a varactor comprised in the RFID transponder, the value of the capacitor.

In one or more embodiments, the varactor changes the value of the capacitor in dependence on the sensed environmental parameter, fabrication parameter and/or functional parameter of the RFID transponder.

DESCRIPTION OF DRAWINGS

Embodiments will be described in more detail with reference to the appended drawings, in which:

FIG. 5A shows an illustrative embodiment of a charge pump component;
FIG. 5B shows the input voltage versus output current of the diode of the charge pump component;

FIG. 5C shows the capacitances versus input voltage of the respective capacitors of the charge pump component;

FIG. 7A shows a further illustrative embodiment of a charge pump component;

FIG. 7B shows the input voltage versus output current of the diode of the charge pump component;

FIG. 7C shows the capacitance versus input voltage of the capacitor of the charge pump component.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders. RFID transponders often contain charge pumps, which are configured to raise the input voltage of the transponders to an adequate operating voltage for the components of the transponders.

RFID communication may be based on inductive coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). The return link may also be referred to as a backscatter signal or more concisely as "backscatter".

In RFID applications a charge pump is often used as a power supply for the voltage domain in which the functional components of an RFID transponder operate. The impedance of such a charge pump may be highly power-dependent and may thus vary significantly in dependence on the input voltage fed to the charge pump. It is noted that the input power range of the charge pump may be very large. This may result in a significant change in the impedance matching over power. In particular, a high field strength may result in a high input power, which in turn results in a large impedance change. As a consequence, the strength of a return link of the RFID transponder (i.e., the backscatter strength) may also be reduced significantly due to a de-tuning caused by the impedance change. Furthermore, an adequate matching and antenna design may be difficult to realize, as a result of the different impedance values at different operating points.

Figure 1:
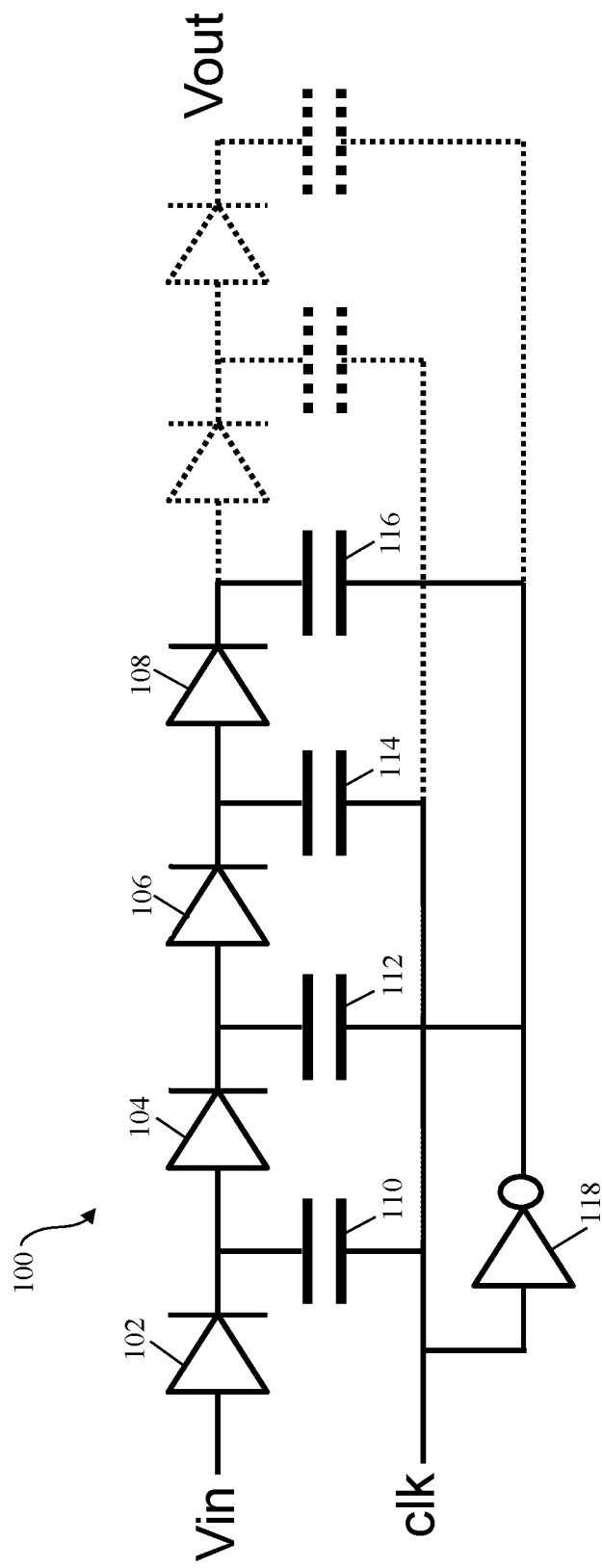
FIG. 1 shows an example of a charge pump.

FIG. 1 shows an example of a charge pump 100 for use an in an RFID transponder. The charge pump 100 comprises a plurality of diodes 102, 104, 106, 108, each of which is coupled to a capacitor 110, 112, 114, 116. The charge pump 100 is configured to convert an input voltage Vin to an output voltage Vout, using the plurality of diodes 102, 104, 106, 108 and the respective capacitors 110, 112, 114, 116.

The charge pump 100 further comprises a clock line clk, which is coupled directly to the capacitors 102, 104, 106, 108 as well as through an inverter 118. It is noted that in RFID applications the clk signal may be derived from the RF field.

In particular, the charge pump 100 is an example of a typical charge pump, in which a clocked charging and discharging of one or more capacitors is performed. Thereby, a low input voltage may effectively be transformed into a higher voltage. More specifically, a sequence of stages or components may be implemented in the charge pump, each of which consists of a diode and an associated capacitor. In this implementation, the capacitor of each stage is loaded via a diode. Each stage of a charge pump is typically designed in such a way that a certain efficiency is achieved under predefined conditions. However, due to the non-linear behavior of the diode, its impedance may change significantly over power, which in turn contributes to a variation of the overall efficiency and impedance of the charge pump. This may lead to a non-optimal and complex tuning of the RFID transponder. Accordingly, it may be desirable to compensate the de-tuning effects, thereby facilitating achieving a higher system performance over a larger input voltage range.

Now discussed are an RFID transponder and a corresponding method of operating an RFID transponder, which facilitate reducing the impact of the variation of the charge pump impedance over power, thereby avoiding that the strength of the return link is significantly reduced as a result of said variation, and further avoiding that an adequate matching and antenna design may be difficult to realize.

Figure 2:
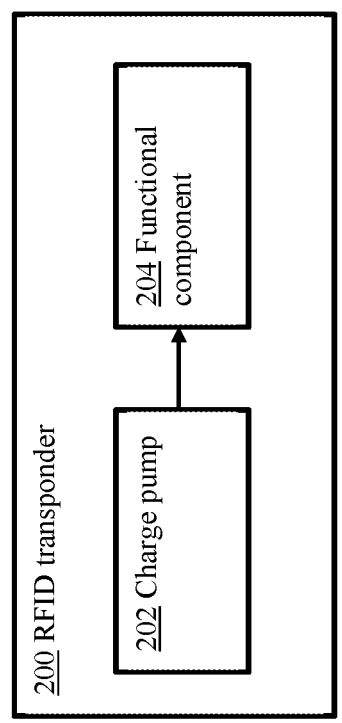
FIG. 2 shows an illustrative embodiment of an RFID transponder.

FIG. 2 shows an illustrative embodiment of an RFID transponder 200. The transponder 200 comprises a charge pump 202 and at least one functional component 204. The charge pump 202 is configured to convert an input voltage of the RFID transponder 200 (e.g., a voltage extracted from a radio frequency field generated by a reader in proximity of the transponder) into a higher output voltage and to supply the output voltage to the functional component 204. Furthermore, the functional component 204 is configured to perform a function of the RFID transponder 200 using the output voltage of the charge pump 202. Furthermore, the charge pump 202 comprises a diode and at least one capacitor (not shown), wherein the capacitor is configured to compensate for a change of the impedance of said diode. Accordingly, instead of—or in addition to—the capacitor of the charge pump shown in FIG. 1, a capacitor is selected which can compensate for a change of the impedance of the diode. It is noted that, instead of a diode, the charge pump 202 may comprise a switch transistor. In that case, instead of a non-linear resistance of the diode, a non-linear behavior of the on-state resistance (RON) of the transistor may occur. Therefore, the capacitor may be configured to compensate for a change of the impedance of the switch transistor, instead of the impedance of the diode. Accordingly, where reference is made in the embodiments described herein to a charge pump component with a diode, a charge pump component with a switch transistor may also be used. Thus, the principles described herein also apply to charge pumps comprising switch transistors instead of diodes.

In other words, the capacitor has an inverse impedance behavior, in the sense that it facilitates compensating the impedance change of the diode coupled to the capacitor. The diode and the capacitor or capacitors coupled to said diode may together constitute a charge pump stage or charge pump component. Thus, by compensating the impedance change of the diode, the variation of the overall impedance of the charge pump 202 may also be reduced. It is noted that the charge pump 202 may comprise further stages or components (not shown), each of which includes a diode operatively coupled to one or more capacitors of the kind set forth.

In one or more embodiments, the charge pump comprises a plurality of capacitors coupled to the diode, wherein said capacitors have different types, values and/or geometries. In this way, the compensation of the impedance change of the diode may be improved. This, in turn, further reduces the overall impedance change of the charge pump. It is noted that one or more of said plurality of capacitors may have an inverse impedance behavior as described above. Furthermore, in one or more embodiments, the RFID transponder further comprises a charge pump controller, which is configured to connect and disconnect the respective capacitors from the diode. In this way, the compensation of the impedance change of the diode may be optimized. This, in turn, further reduces the overall impedance change of the charge pump. Also, in one or more embodiments, the charge pump controller is configured to connect and disconnect at least one of the plurality of capacitors from a clock input line of the charge pump. In this way, the compensation of the impedance change of the diode may be further improved. This, again, further reduces the overall impedance change of the charge pump.

In one or more embodiments, the RFID transponder further comprises at least one sensor configured to sense an environmental parameter, a fabrication parameter and/or a functional parameter of the RFID transponder. The compensation of the impedance change may be made dependent on the value of these parameters. In this way, the compensation may be further improved. Furthermore, in one or more embodiments, the RFID transponder further comprises a varactor configured to change the value of the capacitor or capacitors which are coupled to the diode. In this way, the compensation of the impedance change of the diode may be further optimized. For instance, the measurement results of the above-mentioned sensor may be used as input for the varactor or as input for a switch which connects and disconnects at least one of the plurality of capacitors from a clock input line of the charge pump.

In one or more embodiments, the capacitor is configured to compensate for a change of the impedance of said diode by having a capacitance which increases, respectively decreases, at substantially the same rate as a resistance of the diode decreases, respectively increases, in response to a change of the input voltage. In this way, compensating for a change of the impedance of the diode is facilitated. In a practical implementation, a capacitor may be selected which ensures that the time constant $\tau = R \cdot C$ of the diode-capacitor combination does not change significantly in response to a change of the input voltage. It is noted that R represents the resistance of the diode and C represents the approximate combined contribution of the capacitance of the diode and the capacitance present on the capacitor. When $\tau$ is kept constant, the impedance changes of the diode are properly compensated and also the efficiency is kept constant. The skilled person will appreciate that different types of capacitors may satisfy this requirement.

Figure 3:
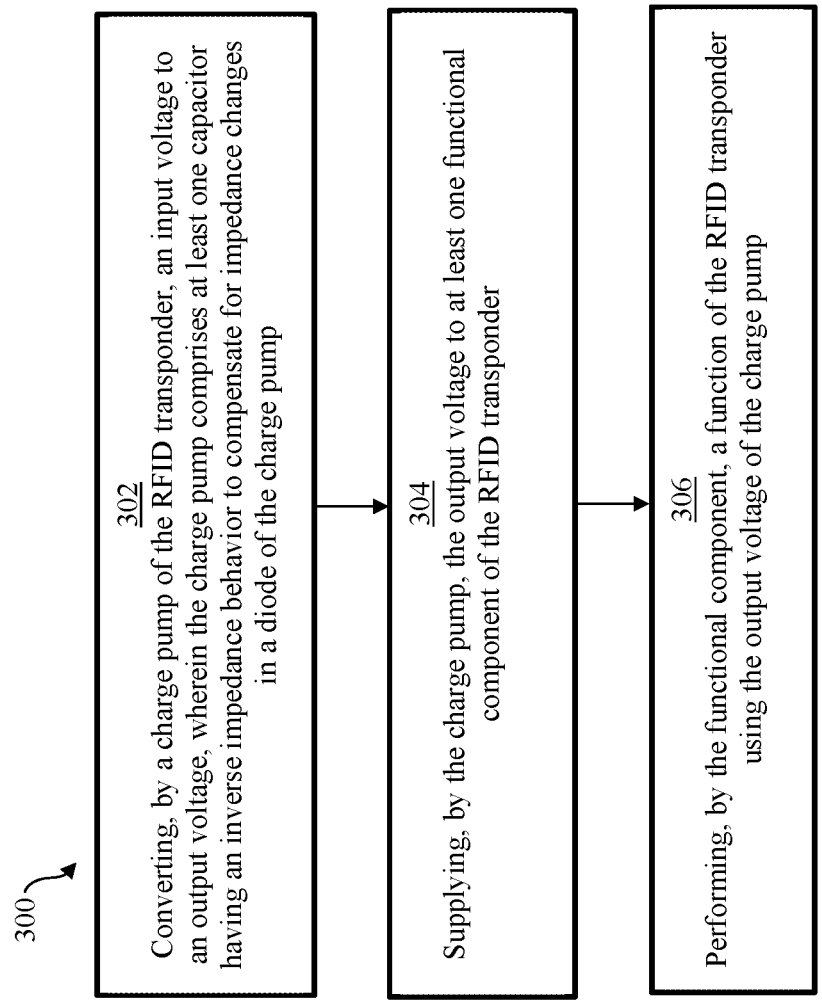
FIG. 3 shows an illustrative embodiment of a method of operating an RFID transponder.

FIG. 3 shows an illustrative embodiment of a method 300 of operating an RFID transponder of the kind set forth. The method 300 includes the following steps. At 302, a charge pump of the RFID transponder converts an input voltage to an output voltage, wherein the charge pump comprises at least one capacitor having an inverse impedance behavior to compensate for impedance changes in a diode of the charge pump. At 304, the charge pump supplies the output voltage to at least one functional component of the RFID transponder. Furthermore, at 306, the functional component performs a function of the RFID transponder using the output voltage of the charge pump. It is noted that the function may be typical function performed by an RFID transponder, such as the previously mentioned load modulation of a carrier signal, which results in a backscatter signal. As mentioned above, the inverse impedance behavior of the capacitor facilitates compensating the impedance change of the diode coupled to the capacitor, which in turn contributes to reducing the overall impedance of the charge pump.

Figure 4A:
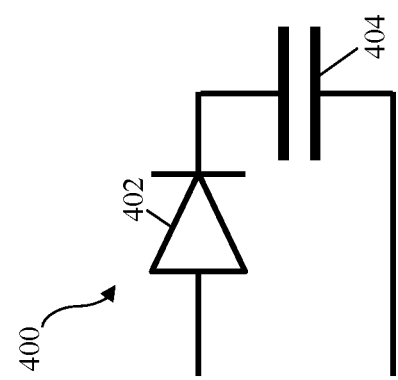
FIG. 4A shows an illustrative embodiment of a charge pump component.
Figure 4B:
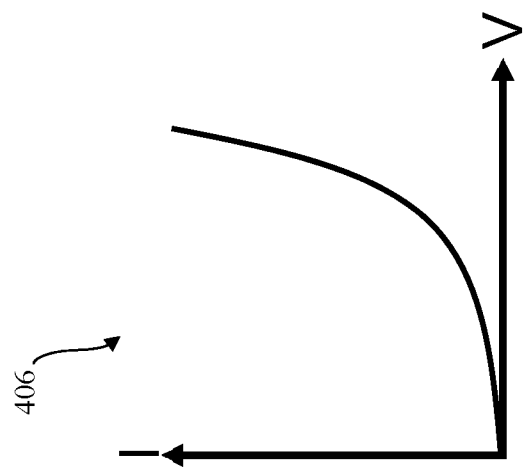
FIG. 4B shows the input voltage versus output current of the diode of the charge pump component.
Figure 4C:
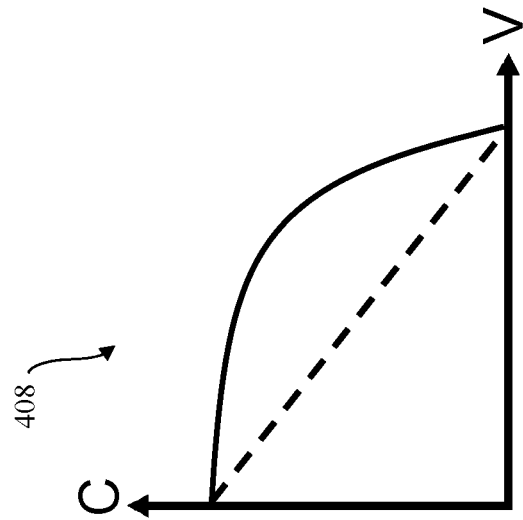
FIG. 4C shows the capacitance versus input voltage of the capacitor of the charge pump component.

FIG. 4A shows an illustrative embodiment of a charge pump component 400 (i.e., a charge pump stage). The charge pump component 400 includes a diode 402 and a capacitor 404 which is operatively coupled to the diode 402. The capacitor 404 has an inverse impedance behavior. FIG. 4B shows a diagram 406 which illustrates the input voltage versus the output current of the diode 402. Furthermore, FIG. 4C shows a diagram 408 which illustrates the capacitance versus the input voltage of the capacitor 404. In particular, in accordance with the present disclosure, a capacitor is used which has an inverse impedance behavior over the input voltage. Thereby, the aforementioned detuning effects may be limited or neutralized. In a practical implementation, the time constant ($\tau$) used for loading the charge pump stage does not change significantly in response to a change of the input voltage. In particular, $\tau$ is defined as follows: $\tau = R \cdot C$, where R is the resistance of the diode and C is the capacitance present on the capacitor. By using such a capacitor which ensures that $\tau$ is kept constant, the impedance change of the diode is properly compensated. The compensation may be linearly or non-linearly.

A charge pump stage often has a diode or a switch transistor and a at least one capacitance. In the ultra-high frequency (UHF) domain the capacitances are usually metal-metal or poly-poly capacitances to avoid non-linearities, voltage dependencies, temperature dependencies and large variations due to processing. Unfortunately, these non-linearities and other constraints can often not be avoided in the diode or the switch transistor. The diode may have a strong process, temperature and voltage dependency. In addition, this dependency is mostly non-linear as the behavior is strongly dependent on the biasing point. Furthermore, in the UHF domain the intrinsic capacitance of the diode becomes relevant and it is significantly impacting the behavior of the charge-pump. By selecting a capacitor that ensures an inversely proportional behavior between the resistance of the diode and the capacitance on the capacitor, these drawbacks may be avoided.

It is noted that a capacitor of the kind set forth may either complement or replace the aforementioned metal-metal or poly-poly capacitance, in such a way that the non-linearities and/or other dependencies are removed or attenuated. Non-limiting examples of suitable capacitors include GO2 capacitors, which are voltage-dependent capacitors. Depending on the connection direction, the impedance change of the diode may effectively be compensated. Other non-limiting examples of suitable capacitors include GO1 or SGO capacitors with a single-gate oxide thickness, GO2 or DGO capacitors with a double HV thickness, and GO3 or TGO capacitors with a triple HV thickness. Furthermore, as mentioned above, the impedance change of the diode may be compensated by using different types of capacitors. In that case, the different types of capacitors may include, for example, poly-nwell, poly-pwell, poly-poly (ONO), poly-contact, and metal-metal.

FIG. 5A shows another illustrative embodiment of a charge pump component 500. The charge pump component 500 comprises a diode 502 operatively coupled to a plurality of capacitors 504, 506, 508, 510, 512. The capacitors 504, 506, 508, 510, 512 may have different types, values and/or geometries. Furthermore, the capacitors 504, 506, 508, 510, 512 may have different inverse impedance behaviors. FIG. 5B shows a diagram 514 which illustrates the input voltage versus the output current of the diode 502. Furthermore, FIG. 5C shows a diagram 516 which illustrates the capacitances versus input voltage of the respective capacitors 504, 506, 508, 510, 512. In particular, the charge pump component 500 represents a further implementation, which may result in a better compensation and an increased linearization. More specifically, the combination of several capacitors of different types, values and geometries may result in a further limitation of the detuning effects. For example, different voltage behaviors may be added or combined to achieve a better impedance compensation.

Figure 6A:
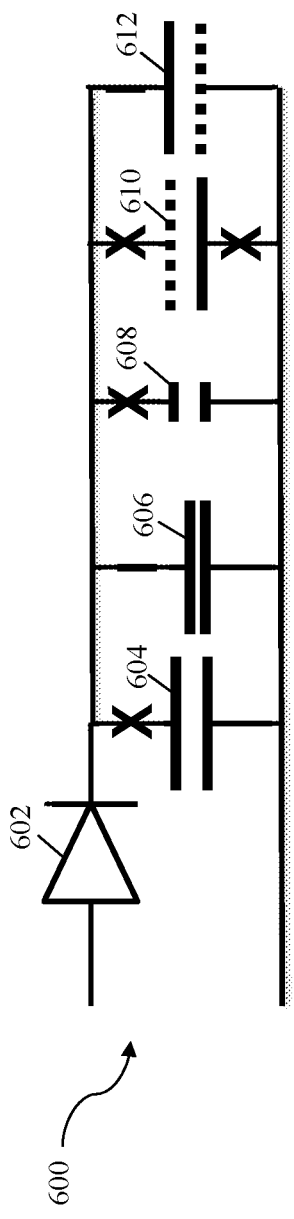
FIG. 6A shows a further illustrative embodiment of a charge pump component.
Figure 6C:
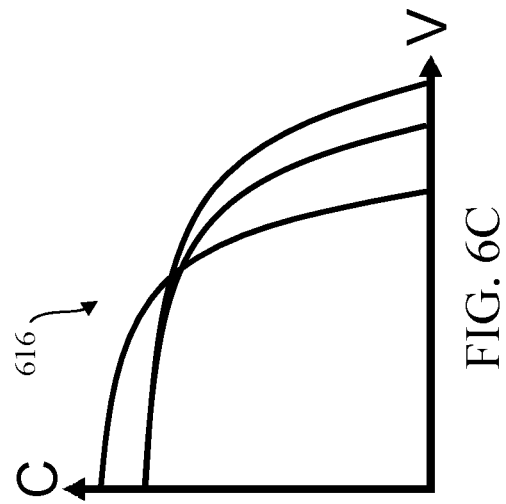
FIG. 6C shows the capacitances versus input voltage of the respective capacitors of the charge pump component.
Figure 6B:
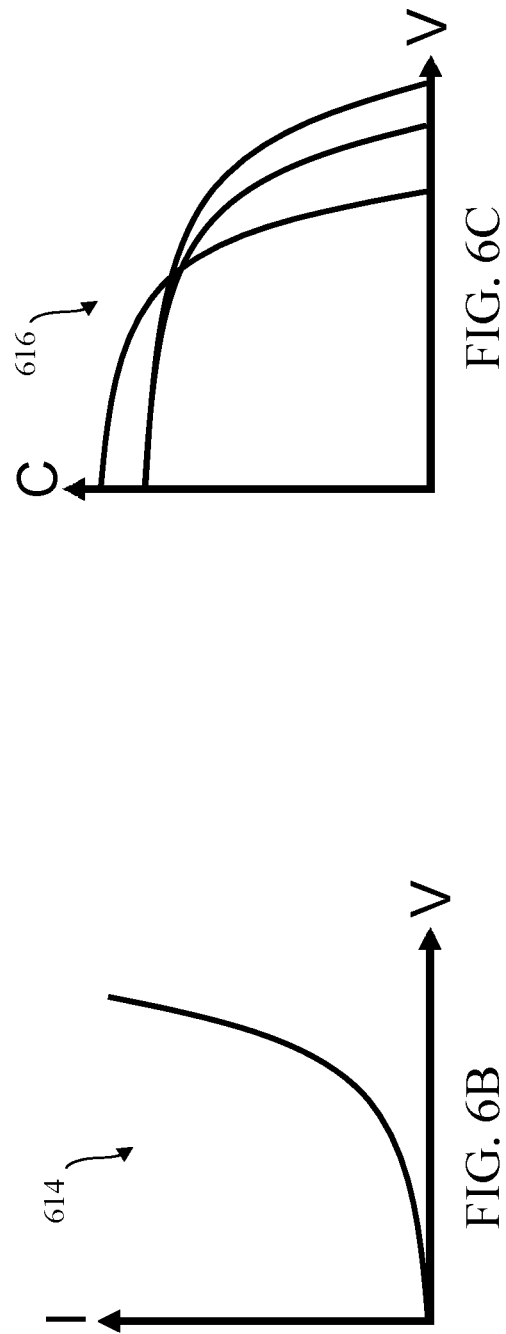
FIG. 6B shows the input voltage versus output current of the diode of the charge pump component.

FIG. 6A shows a further illustrative embodiment of a charge pump component 600. The charge pump component 600 comprises a diode 602 operatively coupled to a plurality of capacitors 604, 606, 608, 610, 612. Again, the capacitors 604, 606, 608, 610, 612 may have different types, values and/or geometries. Furthermore, the capacitors 604, 606, 608, 610, 612 may have different inverse impedance behaviors. Furthermore, a charge pump controller (not shown) is configured to connect and disconnect the respective capacitors 604, 606, 608, 610, 612 from the diode 602. In addition, the charge pump controller may connect and disconnect capacitor 610 from a clock line of the charge pump. It is noted that the symbol "X" indicates that a capacitor can be disconnected. Furthermore, a dotted line indicates that the geometry of a capacitor may vary. FIG. 6B shows a diagram 614 which illustrates the input voltage versus output current of the diode 602 of the charge pump component 600, and FIG. 6C shows a diagram 616 which illustrates the capacitances versus input voltage of the respective capacitors 604, 606, 608, 610, 612 of the charge pump component 600.

In particular, in these embodiments, one or more capacitors 604, 606, 608, 610, 612 may be added to or removed from the charge pump impedance in a dynamic manner. These capacitors may be of the same type, size or geometry, or, as shown, the capacitors 604, 606, 608, 610, 612 may have different types, sizes and/or geometries. The addition and removal of capacitors 604, 606, 608, 610, 612 may for example be triggered by a command sent by a reader. Alternatively, or in addition, sensor levels or indicators may be used to trigger the addition and removal of capacitors 604, 606, 608, 610, 612. This allows a command-dependent impedance compensation. It is noted that also a negative compensation may be achieved (de-tuning gain). The position at which the respective capacitors 604, 606, 608, 610, 612 can be disconnected may also be selectable. In other words, all or some of the capacitors 604, 606, 608, 610, 612 could be disconnected and reconnected. Furthermore, the capacitors 604, 606, 608, 610, 612 may be disconnected and reconnected at the top plate (i.e., where the capacitors 604, 606, 608, 610, 612 are coupled to the diode 602), at the bottom plate (i.e., where the capacitors 604, 606, 608, 610, 612 are coupled to the clock line), or at both the top plate and the bottom plate. For the selection of the positions at which the capacitors 604, 606, 608, 610, 612 can be disconnected the variations of the specific parasitic properties of the charge pump may be taken into account. Furthermore, sensors or indicators may sense and monitor environmental parameters (for example temperature, humidity, light), fabrication process results (for example threshold voltage, resistivity, capacitance of specific components) or functional parameters (for example power, voltage, current, charge) belonging to or related to the RFID transponder.

FIG. 7A shows a further illustrative embodiment of a charge pump component 700. The charge pump component 700 comprises a diode 702 and a capacitor 704 operatively coupled to the diode 702. The capacitor 704 has an inverse impedance behavior. Furthermore, the charge pump component 700 comprises a varactor. In this embodiment, the varactor includes the diode 702, the capacitor 704 and a controllable voltage source 706. Accordingly, the capacitor 704 has a variable capacitance, which can be changed by means of the controllable voltage source 706. FIG. 7B shows a diagram 708 which illustrates the input voltage versus output current of the diode 702 of the charge pump component 700. Furthermore, FIG. 7C shows a diagram 710 which illustrates the capacitance versus input voltage of the capacitor 704 of the charge pump component 700. In particular, in these embodiments, a varactor and a control signal are used to dynamically change the capacitor value and therefore the impedance of the charge pump. The voltage signal may be static, dynamic or a combination of both. The voltage may be generated in dependence on the output of the aforementioned sensors, monitors or indicators.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 charge pump
102 diode
104 diode
106 diode
108 diode
110 capacitor
112 capacitor
114 capacitor
116 capacitor
118 inverter
200 RFID transponder
200 charge pump
204 functional component
300 method of operating an RFID transponder
302 converting, by a charge pump of the RFID transponder, an input voltage to an output voltage, wherein the charge pump comprises at least one capacitor having an inverse impedance behavior to compensate for impedance changes in a diode of the charge pump
304 supplying, by the charge pump, the output voltage to at least one functional component of the RFID transponder
306 performing, by the functional component, a function of the RFID transponder using the output voltage of the charge pump
400 charge pump component
402 diode
404 capacitor having an inverse impedance behavior
406 input voltage versus output current of the diode
408 capacitance versus input voltage of the capacitor
500 charge pump component
502 diode
504 capacitor
506 capacitor
508 capacitor
510 capacitor
512 capacitor
514 input voltage versus output current of the diode
516 capacitances versus input voltage of the respective capacitors
600 charge pump component
602 diode
604 capacitor
606 capacitor
608 capacitor
610 capacitor
612 capacitor
614 input voltage versus output current of the diode
616 capacitances versus input voltage of the respective capacitors
700 charge pump component
702 diode
704 capacitor
706 varactor
708 input voltage versus output current of the diode
710 capacitance versus input voltage of the capacitor

The invention claimed is:

1. A radio frequency identification, RFID, transponder, comprising a charge pump and at least one functional component, wherein:

the charge pump is configured to convert an input voltage into an output voltage and to supply the output voltage to the functional component;

the functional component is configured to perform a function of the RFID transponder using the output voltage of the charge pump;

wherein the charge pump comprises a plurality of stages, each stage comprising a diode or switch transistor and a plurality of capacitors coupled to said diode or switch transistor, and wherein the plurality of capacitors is configured to compensate for a change of an impedance of said diode or switch transistor.

2. The RFID transponder of claim 1, wherein said plurality of capacitors have different types, values and/or geometries.

3. The RFID transponder of claim 1, further comprising a charge pump controller which is configured to connect and disconnect the respective capacitors from the diode or switch transistor.

4. The RFID transponder of claim 3, wherein the charge pump controller is further configured to connect and disconnect at least one of said capacitors from a clock input line of the charge pump.

5. The RFID transponder of claim 1, further comprising at least one sensor configured to sense an environmental parameter, a fabrication parameter and/or a functional parameter of the RFID transponder.

6. The RFID transponder of claim 1, wherein the plurality of capacitors together provides an inverse impedance behavior relative to an impedance of the diode.

7. The RFID transponder of claim 6, wherein one or more of the plurality of capacitors may be selectably added to or removed to change an impedance of the plurality of capacitors.

8. The RFID transponder of claim 1, wherein the plurality of capacitors is configured to compensate for a change of the impedance of said diode or switch transistor by having a capacitance which increases, respectively decreases, at substantially the same rate as a resistance of the diode or switch transistor decreases, respectively increases, in response to a change of the input voltage.

9. A method of operating an RFID transponder, the method comprising:

converting, by a charge pump of the RFID transponder, an input voltage to an output voltage, wherein the charge pump comprises a plurality of stages, each stage comprising a diode or switch transistor and a plurality of capacitors coupled to said diode or switch transistor, and wherein the plurality of capacitors compensate for a change of an impedance of said diode or switch transistor;

supplying, by the charge pump, the output voltage to at least one functional component of the RFID transponder;

performing, by the functional component, a function of the RFID transponder using the output voltage of the charge pump.

10. The method of claim 9, wherein said plurality of capacitors have different types, values and/or geometries.

11. The method of claim 10, further comprising connecting and disconnecting, by a charge pump controller comprised in the RFID transponder, the respective capacitors from the diode or switch transistor.

12. The method of claim 11, further comprising connecting and disconnecting, by the charge pump controller, at least one of said capacitors from a clock input line of the charge pump.

13. The method of claim 9, further comprising sensing, by at least one sensor comprised in the RFID transponder, an environmental parameter, a fabrication parameter and/or a functional parameter of the RFID transponder.

14. The method of claim 9, wherein the plurality of capacitors together provides an inverse impedance behavior relative to an impedance of the diode.

15. The method of claim 9, wherein one or more of the plurality of capacitors may be selectably added to or removed to change an impedance of the plurality of capacitors.

16. The method of claim 9, wherein the plurality of capacitors compensates for a change of the impedance of said diode or switch transistor by having a capacitance which increases, respectively decreases, at substantially the same rate as a resistance of the diode or switch transistor decreases, respectively increases, in response to a change of the input voltage.

17. The method of claim 9, wherein the method is implemented in a computer program stored in a non-transitory machine-readable medium comprising executable instructions which, when executed by a radio frequency identification, RFID, transponder, cause said RFID transponder to perform the method.

\* \* \* \* \*